(12) United States Patent
Evrard et al.

(10) Patent No.: US 8,996,206 B2
(45) Date of Patent: Mar. 31, 2015

(54) AIRCRAFT POWER PLANT, AN AIRCRAFT, AND A METHOD OF PILOTING SAID AIRCRAFT

(71) Applicant: Eurocopter, Marignane, Cedex (FR)

(72) Inventors: Jean Philippe Evrard, Marseilles (FR); Alban Corpron, Salon de Provence (FR)

(73) Assignee: Airbus Helicopters, Marignane Cedex (FR)

( * ) Notice: Subject to any disclaimer, the term of this patent is extended or adjusted under 35 U.S.C. 154(b) by 255 days.

(21) Appl. No.: 13/737,021

(22) Filed: Jan. 9, 2013

(65) Prior Publication Data
US 2013/0184903 A1    Jul. 18, 2013

(30) Foreign Application Priority Data
Jan. 12, 2012    (FR) ..................................... 12 00089

(51) Int. Cl.
*F02C 9/42*    (2006.01)
*B64D 31/00*    (2006.01)
*B64D 31/06*    (2006.01)
*B64C 27/04*    (2006.01)

(52) U.S. Cl.
CPC ............... *B64D 31/00* (2013.01); *B64D 31/06* (2013.01); *B64C 27/04* (2013.01); *F02C 9/42* (2013.01); *Y02T 50/671* (2013.01)
USPC ............................................. 701/15; 701/16

(58) Field of Classification Search
CPC ........ B64D 31/00; B64D 31/06; B64D 31/12; B64C 27/00; B64C 27/04; G05D 1/0858; F02C 9/42; Y02T 50/671
USPC ........................................... 701/15, 16; 244/53
See application file for complete search history.

(56) References Cited

U.S. PATENT DOCUMENTS

| 5,873,546 | A | 2/1999 | Evans |
| 5,915,273 | A | 6/1999 | Germanetti |
| 6,340,289 | B1 | 1/2002 | Vos |
| 6,625,987 | B2 | 9/2003 | Pisano |
| 7,532,970 | B1 * | 5/2009 | Lardillon ...................... 701/100 |
| 7,668,639 | B2 | 2/2010 | Francois |

(Continued)

FOREIGN PATENT DOCUMENTS

| EP | 0816226 A1 | 1/1998 |
| EP | 1281846 A2 | 2/2003 |

(Continued)

OTHER PUBLICATIONS

Search Report and Written Opinion; Application No. FR 1200089; dated Aug. 24, 2012.

*Primary Examiner* — John Q Nguyen
*Assistant Examiner* — Nadeem Odeh
(74) *Attorney, Agent, or Firm* — Brooks Kushman P.C.

(57) ABSTRACT

An aircraft power plant (2) having at least two engines (3, 4), each co-operating with respective control means (5) including respective memories (6), each memory (6) containing information for causing said engine (3, 4) to operate with a plurality of distinct utilization envelopes at iso-damage. Said power plant (2) includes determination means (10) for determining a first utilization envelope (101) for application during a takeoff stage of flight and a second utilization envelope (102) for application during a cruising stage of flight following the takeoff stage of flight, and a third utilization envelope (103) for application during a landing stage of flight following the cruising stage of flight.

19 Claims, 1 Drawing Sheet

(56) References Cited

U.S. PATENT DOCUMENTS

2007/0142980 A1* 6/2007 Ausman et al. .................. 701/3
2008/0275597 A1   11/2008 Gaulmin
2009/0186320 A1   7/2009 Rucci
2012/0109426 A1*  5/2012 Camhi ........................... 701/15

FOREIGN PATENT DOCUMENTS

| FR | 2602270 A1 | 2/1988 |
| FR | 2878288 A1 | 5/2006 |
| FR | 2902408 A1 | 12/2007 |
| WO | 9951868 A1 | 10/1999 |

* cited by examiner

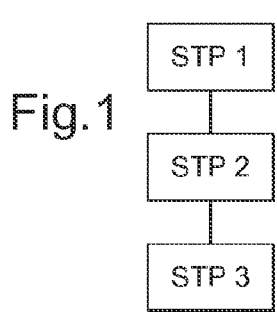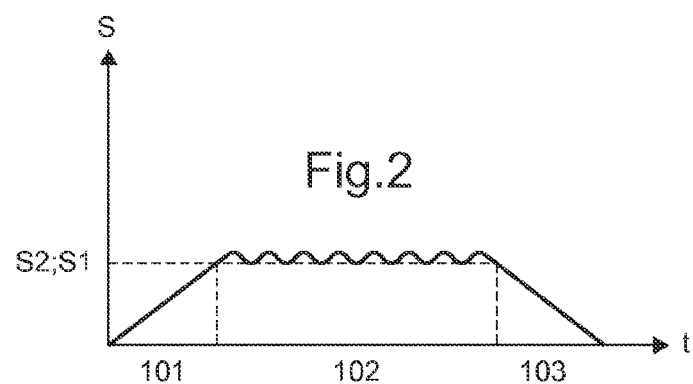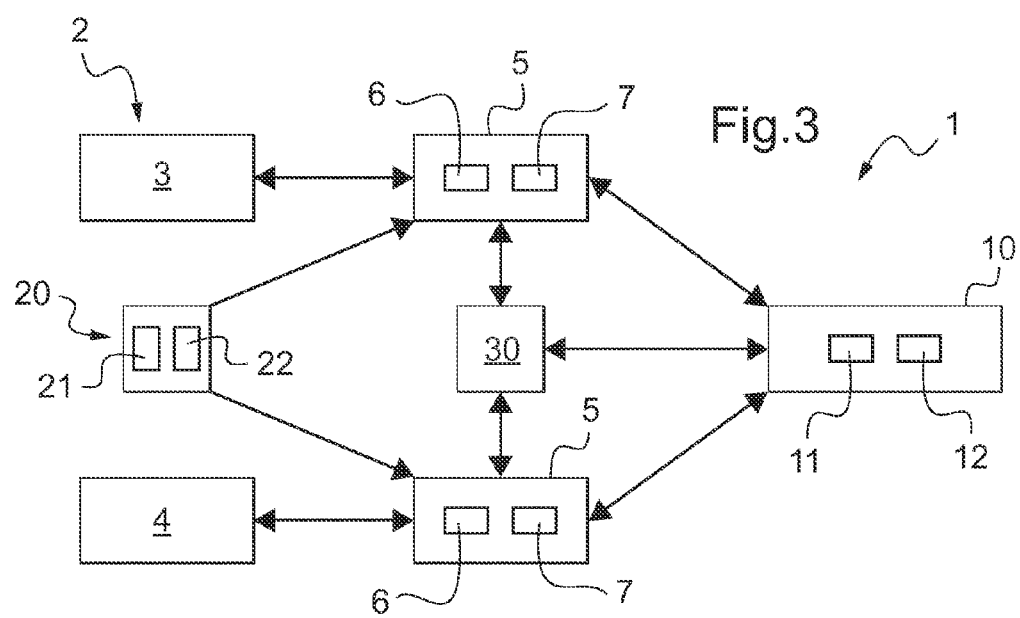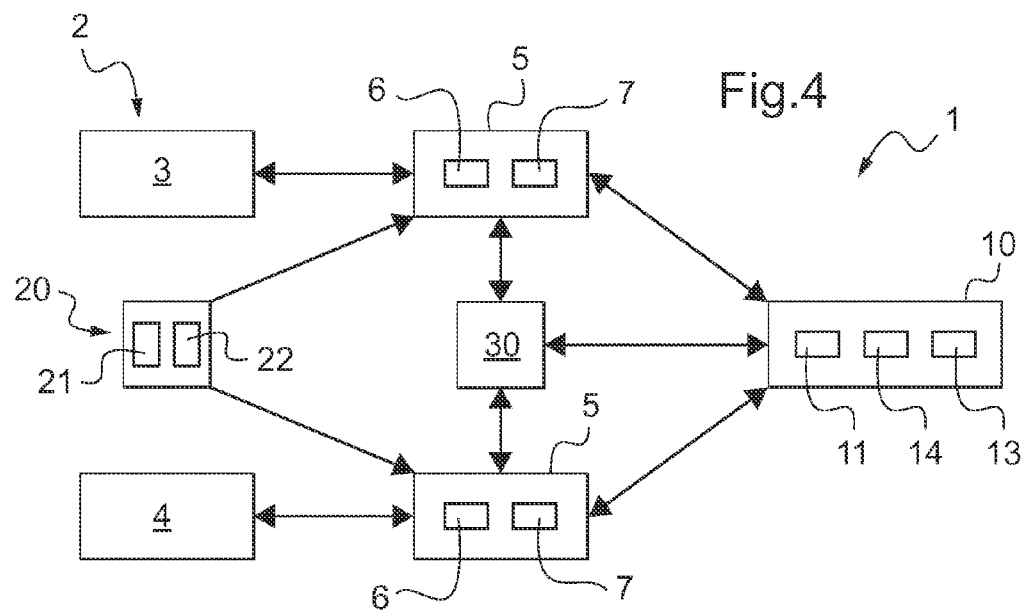

AIRCRAFT POWER PLANT, AN AIRCRAFT, AND A METHOD OF PILOTING SAID AIRCRAFT

CROSS REFERENCE TO RELATED APPLICATIONS

This application claims priority to French patent application No. FR 12 00089 filed on Jan. 12, 2012, the disclosure of which is incorporated in its entirety by reference herein.

BACKGROUND OF THE INVENTION (1) Field of the Invention

The present invention relates to a power plant for an aircraft, in particular a rotorcraft, and to a method of piloting said aircraft.

(2) Description of Related Art

Most presently-manufactured rotorcraft have one or two turboshaft engines. Power is then taken from a low pressure turbine referred to as a "free turbine" that is mechanically independent of the engine assembly comprising a compressor and the high pressure stage, and in particular including a high pressure turbine. The free turbine of an engine generally rotates at 20,000 revolutions per minute (rpm) to 50,000 rpm, so a speed-reducing gearbox is needed for the connection with the main rotor of the rotorcraft since its speed of rotation lies substantially in the range 200 rpm to 400 rpm: this is the main power transmission gearbox referred to more simply as the main gearbox (MGB).

Thermal limitations of an engine and torque limitations of a main gearbox serve to define a utilization envelope for the engine covering at least two normal utilization ratings of an engine mounted on a single-engined or twin-engined rotorcraft:

a takeoff rating corresponding to a torque level for the main gearbox and to heating of the engine that are acceptable for a limited length of time without significant degradation, this takeoff rating being defined by a maximum takeoff power PMD and a duration of utilization of the maximum takeoff power that is generally of the order of 5 minutes; and a maximum continuous rating, the maximum continuous rating being defined by a maximum continuous power PMC corresponding to about 90% of the maximum takeoff power PMD and by a duration of utilization for the maximum continuous power that is generally unlimited.

On a twin-engined rotorcraft, the utilization envelope also covers super-contingency ratings, that are used only when one of the two engines has failed;

a first contingency rating, this first contingency rating being defined by a super-contingency power that is often equal to about 112% to 120% of the maximum takeoff power PMD and by a duration of utilization of this super-contingency power that is generally about thirty consecutive seconds at the most, known as one engine inoperative thirty seconds (OEI30") rating, which super-contingency rating is conventionally usable three times during a flight;

a second contingency rating, this second contingency rating being defined by a maximum contingency power PMU equal to about 105% to 110% of the maximum take off power PMD and by a duration of utilization of this maximum contingency power PMU of the order of two consecutive minutes at most (OEI2'); and a third contingency rating, this third contingency rating being defined by an intermediate contingency power that is substantially equal to the maximum takeoff power PMD and by a duration of utilization of this intermediate contingency power that is unlimited for the remainder of the flight after the failure of an engine (OEIcont).

Thus, the engine manufacturer defines a utilization envelope for the engine, this utilization envelope comprising a plurality of ratings, each rating associating a level of power developed by the engine with a duration of utilization for that power. Use is sometimes made more simply of the term "envelope" or of the expression "performance envelope" to designate such a utilization envelope.

The power differences between the various ratings may also be referred to as "power staging" of the engine.

Furthermore, the thermal and mechanical constraints and above all the phenomenon of the turbine blades creeping can lead to the engine being degraded to a greater or lesser extent depending on the rating. In order to guarantee both safety in flight and also that performance is achieved, the maximum acceptable damage for an engine is determined.

Thereafter, the potential overall utilization of the engine is evaluated. Concretely, this amounts to defining a maximum number of hours of flight, referred to as time between overhauls (TBO) by the person skilled in the art, that the engine is capable of performing from its most recent overhaul or from its first utilization, depending on the circumstances applicable. Once this maximum number of flying hours has been reached, the engine is removed from the aircraft and then overhauled.

Thus, the engine manufacturer defines a utilization envelope for the engine that is associated with a maximum number of flying hours, the utilization envelope being made up of a plurality of ratings, each rating associating a power developed by the engine with a duration of utilization of that power. The engine manufacturer also associates a maximum number of flying hours with the utilization envelope.

It should be recalled that a turbine engine is usually associated with control means, and the information relating to the ratings of a utilization envelope is stored in the control means. Under such circumstances, when the pilot of an aircraft requires a given rating to be used, the control means control the engine and in particular its fuel metering pump so that the engine responds to the order given.

Furthermore, in order for a rotorcraft to obtain authorization to fly in any given country, it will be understood that the utilization envelope and the maximum number of flying hours of the engine(s) of the rotorcraft need to be certified by the official services of the country in question for a specified spectrum of utilization. Such authorization is therefore obtained only after full certification testing, e.g. including an endurance test.

Such complete certification testing of an engine is performed in order to justify a utilization envelope associated with a maximum number of flying hours. It is then not permissible to use the engine with a utilization envelope that is different from the initially authorized utilization envelope, without performing additional complete certification testing, which is very expensive.

It can be understood that a given engine may correspond to a particular type of mission. Nevertheless, the engine is in danger of not having optimized staging for the ratings of its utilization envelope if it is to be used with a different type of mission.

For example, a rescue mission with winching requires an engine to operate with a utilization envelope that is different from a utilization envelope that has been optimized for a mere ferrying mission.

The power levels of the contingency ratings are even more sensitive when they are used as a result of an engine failing.

Thus, after an engine failure during takeoff from a spot heliport, it is advantageous to have a high level of OEI30" super-contingency power available in order to keep the aircraft in flight, rather than a high level of intermediate contingency power OEIcont.

Conversely, during a stage of cruising flight on instruments or a takeoff from open terrain, it is advantageous to have a high level of intermediate contingency power OEIcont.

Under such circumstances, a utilization envelope enables one type of mission to be performed, but does not, a priori, enable some other type of mission to be performed, or at least not in optimized manner.

A manufacturer thus defines the utilization envelope for an engine by making compromises as a function of the missions to be performed.

A power plant is also known that has at least one engine and corresponding means for controlling the engine. The control means comprise a memory containing information to cause the engine to operate with at least two distinct utilization envelopes during a maximum number of flying hours, each utilization envelope having at least two distinct utilization ratings, each defined by a developed power and by a duration of utilization of that developed power, said at least two utilization envelopes comprising a utilization envelope for optimizing takeoff from a platform, and another utilization envelope for takeoff in optimized manner from takeoff zones that do not include platforms.

With the help of selection means, a pilot can select which utilization envelope to apply.

According to document FR 2 878 288, it is possible to modify a utilization envelope of a turbine engine by modifying the maximum number of flying hours.

According to document FR 2 878 288, starting from an initial utilization envelope, an alternative utilization envelope is established. The changeover from the initial utilization envelope to the alternative utilization envelope is performed without modifying the maximum number of flying hours of the engine but by lowering the value of a parameter of the initial utilization envelope. For example, the power of a given rating is increased but the duration of utilization of that rating is shortened.

The state of the art also includes documents EP 1 281 846 and FR 2 602 270 that mention the possibility of re-evaluating the limits of an engine in the event of an emergency.

Also known are the following documents: U.S. 2009/0186320, U.S. Pat. No. 5,873,546, WO 99/51868, EP 0 816 226, and FR 2 902 408.

According to document U.S. 2009/186320 A1, an available power margin is determined and then a variable bias relative to the power margin in order to simulate reduced power. Under such circumstances, it is possible in equivalent manner to reduce the power developed by each engine or to act as a function of the weight conditions of the aircraft.

Thereafter, document U.S. 2009/186320 A1 describes an operating envelope and introducing bias in order to simulate a failure.

Document U.S. Pat. No. 5,873,546 A also suggests introducing bias.

Document WO 99/51868 A1 relates to a method and a device for controlling the thrust of an aircraft with the help of a single lever.

Document EP 0 816 226 A1 describes a cockpit indicator. FIG. 5 shows a curve illustrating flight stages.

Document FR 2 902 408 A1 describes a method of balancing two turbine engines.

BRIEF SUMMARY OF THE INVENTION

Under such conditions, an object of the present invention is to provide an aircraft power plant, an aircraft, and a method of piloting said aircraft to enable a given aircraft to be used with multiple utilization spectra without modifying the power plant of the engine.

The invention thus provides an aircraft power plant having at least two engines. Each engine may be a fuel-burning engine, and in particular a turboshaft engine.

Each engine co-operates with respective control means including a memory, each memory containing information to operate the engine in accordance with a plurality of distinct utilization envelopes at iso-damage.

The term "iso-damage" is used to mean that the utilization of each engine generates an identical amount of damage in an engine. The prefix "iso" comes from the Greek "ἴσος" meaning "equal".

Each utilization envelope then comprises at least two distinct contingency utilization ratings for use by an engine operating in the event of a failure of at least one other engine, and each defined by a developed contingency power and by a duration of utilization for said contingency power.

Two distinct utilization envelopes then comprise distinct contingency ratings, a contingency rating of one utilization envelope differing from a contingency rating of another utilization envelope in terms of a power to be developed and/or of a duration of utilization of that different power.

Two distinct utilization envelopes may have normal utilization ratings that are identical.

Consequently, each memory may contain at least one relationship for regulating an engine associated with at least one utilization envelope.

Reference may be made to the literature to obtain information about the utilization envelopes of an engine and the way in which they are applied.

This power plant is remarkable in particular in that it includes determination means for determining a first utilization envelope for application during a takeoff stage of flight and a second utilization envelope for application during a cruising stage of flight following the takeoff stage of flight, and a third utilization envelope for application during a landing stage of flight following the cruising stage of flight. The determination means communicate with each of the control means to specify which first utilization envelope, second utilization envelope, and third utilization envelope are to be used during the flight, each memory including instructions enabling a control means apply the utilization envelope that corresponds to the current stage of flight in order to control the engine.

In a first variant, the determination means determine the current stage of flight and transmit this current stage of flight to each control means. Each control means uses the utilization envelope that corresponds to that stage of flight for controlling the engines, this utilization envelope thus being either the first envelope or the second envelope or the third envelope.

In a second variant, each memory has instructions enabling control means to determine the current stage of flight and thus the utilization envelope to be applied for controlling the engines.

Thus, each engine can operate with a plurality of utilization envelopes.

The invention thus proposes considering that a flight takes place in three different stages, and enables each stage of flight to be associated with a utilization envelope.

Takeoff takes place by operating the engines in a utilization envelope referred to as the "first utilization envelope".

Once the aircraft reaches the predetermined conditions for the cruising stage of flight, each engine no longer operates as a function of the regulation relationships of the first utilization envelope, but as a function of the regulation relationships of another utilization envelope referred to as the "second utilization envelope".

Finally, when the predetermined conditions for the landing stage of flight are reached, each engine is controlled in accordance with a last utilization envelope referred to as the "third utilization envelope".

Depending on the takeoff area, on the profile of the mission, and on the landing area, it is possible to assign optimum characteristics to each of the first, second, and third utilization envelopes.

For example, each engine may operate with a plurality of utilization envelopes, each comprising the same contingency ratings, such as the above-described first, second, and third contingency ratings. However, the power that is developed and the duration of utilization of a contingency rating can vary from one utilization envelope to another.

It is possible for the first utilization envelope to select an envelope that makes provision for a high OEI30" super-contingency rating to the detriment of a relatively low OEIcont intermediate contingency rating if landing is performed on a platform at sea.

However, if landing takes place on clear ground, it is possible to select an envelope that makes provision for a high OEIcont contingency intermediate power for the third utilization envelope.

The invention thus makes it possible to make use of the capacity of an engine to operate at iso-damage with a plurality of distinct utilization envelopes. The power plant gives the pilot the option of using the engines of the aircraft with a utilization envelope that is adapted to the current stage of flight and to the mission that is to be performed.

The power plant may also include one or more of the following additional characteristics.

For example, the power plant may have a first system for determining a speed of the aircraft and a second system for determining an altitude and/or a height of the aircraft depending on the variant. Furthermore, the first system and the second system are either connected to each of the control means or else they are connected to the determination means for determining the current stage of flight.

Thus, the changeover from the takeoff stage of flight to the cruising stage of flight may be performed as from a first speed threshold and a first altitude and/or height threshold.

Likewise, the changeover from the cruising stage of flight to the landing stage of flight may be performed as from a second speed threshold and a second altitude threshold, or a second speed threshold and a second height threshold.

Furthermore, in a first embodiment, each memory includes a pre-established list of utilization envelopes for the engines, the determination means having the function of making it possible to select the first utilization envelope, the second utilization envelope, and the third utilization envelope from said list.

The manufacturer thus draws up a catalog of utilization envelopes suitable for use in flight, these utilization envelopes constituting said pre-established list.

A pilot may select three utilization envelopes contained in the catalog and may assign them respectively to the first utilization envelope, to the second utilization envelope, and to the third utilization envelope.

Depending on the variant, the list of utilization envelopes is stored:
within the determination means and in each memory;
within storage means accessible to the determination means and in each memory; or
solely in said memories, the determination means having access to the memories.

It can be understood that the set of utilization envelopes in the catalog is certified by the manufacturer.

Furthermore, all of the utilization envelopes of the list and their characteristics may be recorded in the flight manual in order to assist the pilot in making a selection.

In a second embodiment, said determination means include a parameter-setting device for defining mission parameters.

Furthermore, in a first variant, said determination means include a computer for determining the first utilization envelope, the second utilization envelope, and the third utilization envelope from a generic envelope, as a function of said mission parameters.

In a second variant, the determination means send the mission parameters to each of the control means, with each of the control means finishing off the preparation of the first utilization envelope and of the second utilization envelope, and of the third utilization envelope on the basis of a generic envelope and as a function of said mission parameters.

Under such circumstances, the manufacturer establishes a generic envelope containing the contingency ratings that are usable together with exchange ratios between their ratings.

By way of example, such an exchange ratio may indicate that increasing one contingency power by 50 watts (W) is equivalent to reducing another contingency power by 10 W, without impact on their durations of utilization.

As a function of the mission parameters, the computer uses the generic envelope to define the three utilization envelopes for associating respectively with the first utilization envelope, the second utilization envelope, and the third utilization envelope.

Such mission parameters may include the duration of the flight, the distance to be traveled, the fuel consumption to be achieved, the weight of the aircraft, the altitude of cruising flight, temperature, wind, and the characteristics of the landing and takeoff areas, for example.

It should be observed that when the first utilization envelope, the second utilization envelope and the third utilization envelope are generated in full by the determination means, each control unit may, for safety reasons, verify that the utilization envelopes produced by the determination means are consistent, e.g. by verifying that the exchange ratios are complied with.

In another aspect, the power plant may include display means for displaying data relating to the current utilization envelope being applied, e.g. the maximum power provided for this current utilization envelope and the duration of utilization of this power.

In addition to a power plant, the invention also provides an aircraft including such a power plant, and in particular a rotary wing aircraft.

The invention also provides a method of piloting an aircraft having a power plant with a plurality of engines and respective control means for each engine. Each control means includes a memory, each memory containing information for operating an engine in application of a plurality of distinct utilization envelopes at iso-damage.

Each utilization envelope also includes at least two distinct contingency utilization ratings for use by an engine in operation in the event of at least one other engine failing and each defined by a developed contingency power and a duration of utilization for said contingency power.

During the method, the following steps are performed:
determining a first utilization envelope for application during a takeoff stage of flight, a second utilization envelope for applying during a cruising stage of flight following the takeoff stage of flight, and a third utilization envelope for applying during a landing stage of flight following the cruising stage of flight;

determining the current stage of flight; and applying the utilization envelope corresponding to the current stage of flight for controlling the engines.

The method may also include one or more of the following additional characteristics.

For example, when a contingency rating is used, the current utilization envelope is retained until the aircraft lands.

Two distinct utilization envelopes give rise to identical damage.

Nevertheless, the same does not necessarily apply for two distinct contingency ratings. In order to avoid installing damage meters, this variant proposes terminating the flight with the current utilization envelope.

In another aspect, modification in flight of the utilization envelope for application during a given stage of flight is authorized only before that given stage of flight has begun.

For example, a pilot may divert the aircraft during the cruising stage of flight to a different landing area. The pilot then assigns a new utilization envelope to the third utilization envelope, the new envelope being adapted to the new landing area.

Furthermore, two of the utilization envelopes that are selectable from among the first utilization envelope, the second utilization envelope, and the third utilization envelope may be identical.

For example, the first utilization envelope and the third utilization envelope may be identical, in particular if the landing zone and the takeoff zone are identical.

In addition, in a first implementation, a storage means has a pre-established list of utilization envelopes and the first utilization envelope, the second utilization, and the third utilization envelope are selected from said list.

In a second implementation, a generic envelope has exchange ratios between two distinct ratings, mission parameters are determined, and then the first utilization envelope, the second utilization envelope, and the third utilization envelope are generated on the basis of the generic envelope as a function of said parameters.

BRIEF DESCRIPTION OF THE SEVERAL VIEWS OF THE DRAWINGS

The invention and its advantages appear in greater detail from the following description of embodiments given by way of illustration and with reference to the accompanying figures, in which:

FIG. 1 is a diagram explaining the method implemented;

FIG. 2 is a graph showing the stages of fight taken into consideration;

FIG. 3 shows an aircraft in a first embodiment; and

FIG. 4 shows an aircraft in a second embodiment.

Elements present in more than one of the figures are given the same references in each of them.

DETAILED DESCRIPTION OF THE INVENTION

FIG. 1 explains a method of piloting an aircraft, the aircraft having at least two engines.

In a first step STP1, a pilot determines:

a first utilization envelope 101 for applying during a takeoff stage of flight;

a second utilization envelope 102 for applying during a cruising stage of flight following the takeoff stage of flight; and a third utilization envelope 103 for applying during a landing stage of flight following the cruising stage of flight.

Each utilization envelope has the same normal utilization ratings and the same contingency utilization ratings in the event of an engine failing. The various prior art ratings may be implemented, i.e., for example, a takeoff rating, a maximum continuous rating, a first contingency rating, a second contingency rating, and a third contingency rating.

Nevertheless, each operating rating defines a power that each engine can develop and a duration over which that power can be utilized.

Under such circumstances, the power and/or the duration of utilization of a contingency rating of a utilization envelope differs from the power and/or the utilization duration of the same contingency rating for another utilization envelope.

The first utilization envelope, the second utilization envelope, and the third utilization envelope may be defined and set before the flight as such, i.e. before takeoff.

Nevertheless, in a variant, it is possible to modify the first and/or the second and/or the third utilization envelope so long as the utilization envelope in question has not yet been used.

For example, during the takeoff stage, it is possible to assign a new utilization envelope to the second utilization envelope or to the third utilization envelope.

Furthermore, each utilization envelope generates the same damage and thus the same maximum number of flying hours TBO.

If an engine fails, each engine that is in operation then operates at a contingency rating.

Under such circumstances, in one variant, each engine in operation is required to use the current utilization envelope until the end of the flight.

For example, if one engine fails during the cruising stage of flight and thus while utilizing the second utilization envelope, landing is performed while using the second utilization envelope and not the third utilization envelope.

In the first implementation, the manufacturer draws up a list of utilization envelopes for the engines. The pilot then selects from that list the utilization envelopes that are to constitute the first, second, and third utilization envelopes.

In a second implementation, a manufacturer establishes a generic envelope, the generic envelope associating each contingency rating with at least one exchange ratio with another contingency rating.

The pilot then establishes the parameters for the mission. The first utilization envelope, the second utilization envelope, and the third utilization envelope are then generated from the generic envelope and from the mission parameters.

For example, the generic envelope comprises:

a first contingency rating defining a first power and a first duration of utilization;

a second contingency rating defining a second power and a second duration of utilization; and a third contingency rating defining a third power and a third duration of utilization.

Furthermore, a first exchange ratio specifies, by way of example, that a given increase in the first power gives rise to a given decrease in the second power, and vice versa, with no change concerning the third contingency rating.

Under such circumstances, the characteristics of a takeoff zone may lead to maximizing the first power.

In this example, the first utilization envelope is then prepared to contain:

a first contingency rating defining a first power that has been maximized, together with the first duration of utilization;

a second contingency rating defining a second power that has been minimized in application of the first exchange ratio, and a second duration of utilization; and a third contingency rating defining a third power and a third duration of utilization.

The cruising stage of flight may be a conventional stage of flight. The second utilization envelope is then identical to the generic envelope.

Finally, the characteristics of the landing zone may require the second contingency power to be maximized.

The third utilization envelope is then prepared so as to contain:

a first contingency rating defining a first power that is minimized in application of the first exchange ratio, and the first duration of utilization;

a second contingency rating defining a second power that is maximized, and a second duration of utilization; and a third contingency rating defining a third power and a third duration of utilization.

Independently of the implementation, it will be understood that two of the utilization envelopes for selecting from among the first utilization envelope, the second utilization envelope, and the third utilization envelope may be identical.

In a second step STP2, the current stage of flight is determined while in flight.

Under such circumstances, during a third step STP3, the utilization envelope associated with the current stage of flight is applied.

FIG. 2 is a graph for clarifying this method. The graph has time plotted along the abscissa axis and a threshold defining each stage of flight plotted up the ordinate axis.

On takeoff, each engine is operating with a first utilization envelope 101.

If an engine fails, each of the engines that remains in operation applies the same contingency rating for the first utilization envelope for the remainder of the flight. The failure may thus cause the mission to be terminated.

In the absence of a failure and once the aircraft reaches a first threshold S1 predetermined by the manufacturer, the aircraft is operating in a cruising stage of flight. Each engine is then required to operate not with the first utilization envelope 101, but with the second utilization envelope 102.

The first threshold may comprise a first altitude threshold and a first forward speed threshold.

The aircraft thus flies during the cruising stage of flight during which the first altitude threshold and the first forward speed threshold are exceeded.

In another variant, the altitude threshold is replaced by a height threshold.

If an engine fails, each of the engines remaining in operation applies the same contingency rating of the second utilization envelope for the remainder of the flight. This failure may thus cause the mission to be terminated.

In the absence of a failure and when the aircraft reaches a second threshold S2 determined by the manufacturer, the aircraft is operating in a landing stage of flight. Each engine is thus required not to operate any longer with the second utilization envelope 102, but rather with the third utilization envelope 103.

FIG. 3 shows an aircraft 1 in a first embodiment.

Independently of the embodiment, the aircraft 1 has a power plant 2.

The power plant 2 has at least two engines 3, 4, each engine 3, 4 being controlled by respective control means 5.

Under such circumstances, each control means 5 possesses a memory 6 and calculation means 7. Each memory 6 includes in particular information for controlling the engines 3, 4 associated therewith in a first utilization envelope 101, a second utilization envelope 102, and a third utilization envelope 103. It is recalled that each utilization envelope has at least two distinct contingency utilization ratings, each of which is defined by a contingency developed power and by a duration of utilization for said contingency rating.

For example, for each rating of each stored utilization envelope, the memory 6 includes at least one regulation relationship for use by calculation means 7 in order to control the supply of fuel to the engine.

The calculation means 7 of each control means thus control the engines 3, 4 associated therewith by applying at least one regulation relationship that results from an operating rating of the utilization envelope that is to be applied.

One such control means 5 is sometimes known under the acronym FADEC.

Reference may be made to the literature to discover how such control means operate.

In the invention, the power plant is provided with determination means 10 in order to be able to determine a first utilization envelope 101 for application during a takeoff stage of flight, and a second utilization envelope 102 for application during a cruising stage of flight, and a third utilization envelope 103 for applying during a landing stage of flight.

The determination means 10 are connected to each control means to participate in generating the first, second, and third utilization envelopes 101, 102, and 103 for application during the flight. The determination means may either instruct the control means as to which first, second, and third utilization envelopes 101, 102, and 103 are to be applied during the flight, or else they may provide the control means with information enabling the control means to determine which first, second, and third utilization envelopes 101, 102, and 103 to apply.

In addition, each memory 6 may include instructions that are executable by the corresponding calculation means 7 in order to determine the current stage of flight, and consequently in order to determine which utilization envelope to use.

Alternatively, the current stage of flight is determined by the determination means.

For this purpose, the aircraft 1 may have a measurement system 20 for measuring data relating to the current stage of flight.

The measurement system 20 shown diagrammatically includes a first system 21 for determining a speed of the aircraft, and in particular the forward speed of the aircraft.

The measurement system 20 also includes a second system 22 for determining an altitude of the aircraft.

The first system 21 and the second system 22 are then both connected to each of the control means 5, or in a variant to the determination means.

Reference may be made to the literature in order to obtain information about such first and second systems 21 and 22.

In another aspect, the power plant described includes display means 30.

The display means 30 communicate with the control means 5 to display data relating to the current utilization envelope. For example, the display means 30 may display the power associating with the current utilization envelope rating that is in use with the utilization time that remains for that rating.

In the first embodiment, the determination means 10 comprise selection means 12 that are operable by an operator, together with information storage means 11. The information storage means 11 may be memories 6 of the control means 5.

The storage means thus contain a list of utilization envelopes capable of constituting the first utilization envelope 101, the second utilization envelope 102, and the third utilization envelope 103.

An operator, e.g. a pilot, then operates the selection means in order to assign utilization envelopes from the list with the first utilization envelope 101 the second utilization envelope 102, and the third utilization envelope 103.

The determination means may include a display system presenting the utilization envelopes of said list, or they may for example communicate with the display means 30 for this purpose.

The utilization envelopes are selected with the help of the determination means 10 while on the ground, and possibly also in flight in accordance with the variant described above.

The determination means 10 inform each of the control means by specifying which utilization envelopes are to be associated with the first, second, and third utilization envelopes.

Each control means then controls the corresponding engine by applying the regulation relationship(s) specific to the utilization envelope for application, with these regulation relationships being stored in the memory 6 of each control means.

In a second embodiment, shown in FIG. 4, the determination means 10 comprise a parameter-setting device 13 operable by an operator, information storage means 11, and a computer 14.

The storage means 11 may possibly be the same as the memory 6, and may contain a generic envelope.

An operator then inputs the parameters of the mission, referred to for convenience as "mission parameters", with the help of the parameter-setting device. Such a parameter-setting device may for example comprise a keyboard and/or a computer mouse, or the equivalent.

The computer 14 receives these mission parameters and automatically deduces therefrom the first utilization envelope, the second utilization envelope, and the third utilization envelope.

This preparation stage may be performed with the help of exchange ratios of the generic envelope and with the help of construction rules defined by the manufacturer.

The determination means then provide the characteristics of the first utilization envelope, of the second utilization envelope, and of the third utilization envelope to each of the control means, namely the power and the duration of utilization for each rating in those utilization envelopes, or indeed the regulation relationships that stem therefrom.

The control means may optionally verify the consistency of the information it receives.

In another variant, the mission parameters are transmitted to each of the control means, with each of the control means deducing therefrom the first utilization envelope, the second utilization envelope, and the third utilization envelope.

Naturally, the present invention may be subjected to numerous variations as to its implementation. Although several implementations are described, it will readily be understood that it is not conceivable to identify exhaustively all possible implementations. It is naturally possible to envisage replacing any of the means described by equivalent means without going beyond the ambit of the present invention.

What is claimed is:

1. An aircraft power plant having at least two engines, each engine controlled by with respective control means including a memory, each memory containing information for causing the engine to operate with a plurality of distinct utilization envelopes at iso-damage, each utilization envelope having at least two distinct contingency utilization ratings for use by an engine operating in the event of a failure of at least one other engine, and each defined by a developed contingency power and by a duration of utilization for the contingency power, wherein the power plant includes determination means for determining a first utilization envelope for application during a takeoff stage of flight and a second utilization envelope for application during a cruising stage of flight following the takeoff stage of flight, and a third utilization envelope for application during a landing stage of flight following the cruising stage of flight, the determination means communicating with each of the control means to specify which first utilization envelope, second utilization envelope, and third utilization envelope are to be used during the flight, each memory including instructions enabling the control means to apply the utilization envelope that corresponds to a current stage of flight in order to control the at least two engines.

2. A power plant according to claim 1, wherein the power plant has a first system for determining a speed of the aircraft and a second system for determining an altitude or a height of the aircraft, the control means being configured to determine the current stage of flight in response to signals from the first system and second system.

3. A power plant according to claim 1, wherein the memory includes a pre-established list of utilization envelopes for the engine, the determination means having the function of making it possible to select the first utilization envelope, the second utilization envelope, and the third utilization envelope from the list.

4. A power plant according to claim 1, wherein the determination means include a parameter-setting device for defining mission parameters.

5. A power plant according to claim 4, wherein the determination means include a computer for determining the first utilization envelope, the second utilization envelope, and the third utilization envelope from a generic envelope, as a function of the mission parameters.

6. A power plant according to claim 1, wherein the power plant includes display means for displaying data relating to the current utilization envelope being applied.

7. An aircraft, wherein the aircraft includes a power plant according to claim 1.

8. A method of piloting an aircraft having a power plant with a plurality of engines, determination means for determining a utilization envelope of the plurality of engines, and respective control means for controlling each engine, each control means including a memory, each memory containing information for operating an engine in application of a plurality of distinct utilization envelopes at iso-damage, each utilization envelope including at least two distinct contingency utilization ratings for use in the event of at least one other engine failing and each defined by a developed contingency power and a duration of utilization for the contingency power, the method being characterized by:

determining by the determining means a first utilization envelope for application during a takeoff stage of flight, a second utilization envelope for applying during a cruising stage of flight following the takeoff stage of flight, and a third utilization envelope for applying during a landing stage of flight following the cruising stage of flight;

determining by the determining means a current stage of flight;

communicating the determined current stage of flight to the control means; and controlling the engines by the control means according to the utilization envelope corresponding to the current stage of flight.

9. A method according to claim 8, wherein when a contingency rating is used, the current utilization envelope is retained until the aircraft lands.

10. A method according to claim 8, wherein modification in flight of a utilization envelope for application during a given stage of flight is authorized only before that given stage of flight has begun.

11. A method according to claim 8, wherein two of the utilization envelopes that are selectable from among the first utilization envelope, the second utilization envelope, and the third utilization envelope are identical.

12. A method according to claim 8, wherein at least one storage means has a pre-established list of utilization envelopes and the first utilization envelope, the second utilization, and the third utilization envelope are selected from the list.

13. A method according to claim 8, wherein a generic envelope has exchange ratios between two distinct ratings, mission parameters are determined, and then the first utilization envelope, the second utilization envelope, and the third utilization envelope are generated on the basis of the generic envelope as a function of the parameters.

14. A power plant system for an aircraft, the power plant system comprising:
a first engine and a second engine;
a selector; and
a controller in communication with the selector, the controller being configured to control the first and second engines based on a current engine utilization envelope, the current engine utilization envelope corresponding to one of a plurality of distinct utilization envelopes at iso-damage, wherein the plurality of distinct utilization envelopes includes a first utilization envelope for a take-off stage, a second utilization envelope for a cruise stage, and a third utilization envelope for a landing stage, the first, second, and third utilization envelopes each having at least two distinct contingency utilization ratings defined by a contingency power and a contingency duration, the controller being further configured to obtain the first, second, and third utilization envelopes in response to at least one input at the selector.

15. The power plant system of claim 14, wherein the at least one input comprises a pilot selection of at least one of a plurality of predefined utilization envelopes.

16. The power plant system of claim 14, wherein the at least one input comprises a set of mission parameters.

17. The power plant system of claim 16, wherein the controller is configured to define the first, second, and third utilization envelopes based on a generic envelope having exchange ratios between two distinct ratings.

18. The power plant system of claim 14, wherein the controller is further configured to detect a current stage of flight as the takeoff stage, the cruise stage, or the landing stage, the detecting being based on a current speed and altitude of the aircraft.

19. The power plant system of claim 14, further comprising a display system, wherein the controller is further configured to display data indicative of the current utilization envelope via the display system.

* * * * *